United States Patent [19]
Morgan

[11] Patent Number: 4,962,645
[45] Date of Patent: Oct. 16, 1990

[54] FOUR CYCLE, EXTERNAL COMBUSTION, CLOSED REGENERATIVE CYCLE, PISTON ENGINE

[75] Inventor: George R. Morgan, 1831 S. Berthed Pl., Tucson, Ariz. 85710

[73] Assignee: George R. Morgan, Tucson, Ariz.

[21] Appl. No.: 400,801

[22] Filed: Aug. 30, 1989

[51] Int. Cl.[5] .................... F02C 1/04
[52] U.S. Cl. .................... 60/682; 60/650
[58] Field of Search .................... 60/650, 682, 517, 516

[56] References Cited

U.S. PATENT DOCUMENTS

| | | | |
|---|---|---|---|
| 3,708,979 | 1/1973 | Bush et al. | 60/682 X |
| 3,867,816 | 2/1975 | Banett | 60/682 |
| 4,077,221 | 3/1978 | Maeda | 60/682 |
| 4,120,161 | 10/1978 | Gedeit | 60/682 |

*Primary Examiner*—Allen M. Ostrager

[57] ABSTRACT

The four cycle external combustion closed regenerative cycle piston engine is an environmentally clean, multi-fueled, efficient, conventional designed device. The engine consists of four major units: the heater, heat exchanger, accumulator, and power units. The engine operates on one power stroke per two revolutions with an unidirectional mass flow of the working fluid minimizing complexity. Each valve of the power unit's four valves per cylinder communicates to its respective major unit, synchronously opening/closing with the piston's position in the power unit cylinder. The intake and compression stroke of the four cycle engine is synchronized with the intake and compression valves and performs the function of a compressor unit reducing the size, weight, cost and complexity of the engine.

1 Claim, 4 Drawing Sheets

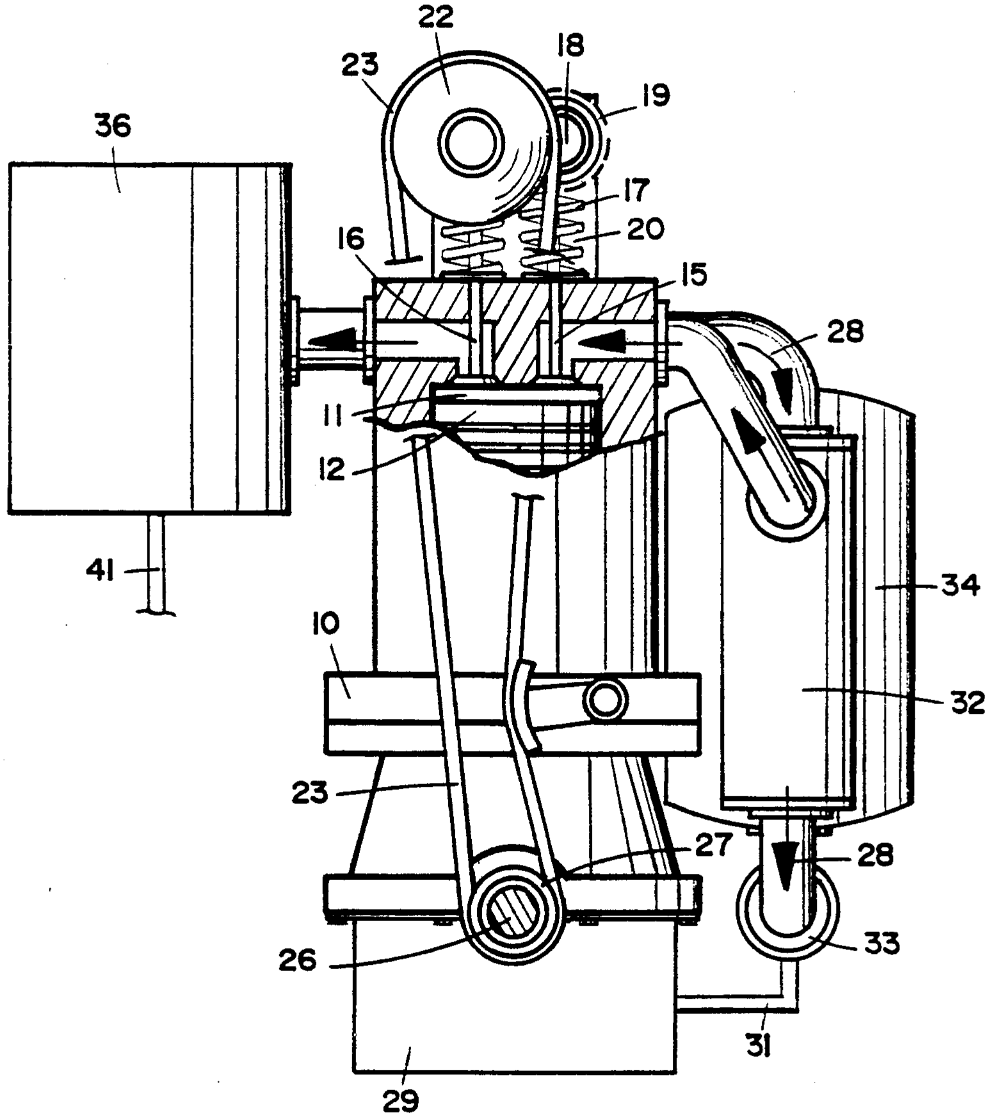
Fig I

FOUR CYCLE, EXTERNAL COMBUSTION, CLOSED REGENERATIVE CYCLE, PISTON ENGINE

OBJECT OF THE INVENTION

The object of this invention is to create a design concept on a four cycle external combustion, closed regenerative cycle piston engine that will be fuel efficient, environmentally clean, multi-fueled, and packaged in a light weight and compact envelope.

Another object of this invention is to change the design concept of an external combustion, closed regenerative cycle piston engine to radically reduce its weight and size by utilizing only the power, heat exchanger, heater and accumulator units, thus eliminating the power unit to operate on one power stroke per two revolutions and incorporating four valves to each cylinder with each valve communicating to a major unit. Therefore, by making the power unit a four valve device and utilizing the intake and compression strokes of the power unit with respective valves, the power unit performs the function of a compressor unit.

Another object of the invention is to have the power unit, as it operates as a compressor unit, closely coupled to the heater unit minimizing dead volume that cannot be heated, and, therefore, reducing the heat loss in the system while decreasing the response time and increasing the efficiency of the engine.

The mass flow of the working fluid will begin at the heater unit which is maintained at a specified temperature and pressure. On command the heater throttle valve releases working fluid into the power cylinder via the power valve, expanding and doing work. The power cylinder piston now moves toward tdc exhausting the working fluid into the heat exchanger unit via the exhaust valve depositing heat through the cooler further reducing the working fluids temperature, then flows into the accumulartor unit where the working fluid is at its lowest temperature and pressure in the system. The piston in the power cylinder moves toward bdc pulling the working fluid from the accumulator unit, modulated by the accumulator control valve, into the power cylinder via the intake valve and through the heat exchanger unit absorbing the residual heat, then is compressed and discharged into the heater unit via the compression valve, completing the working fluid mass flow of a closed regenerative cycle engine.

For an additional increase in engine efficiency and a reduction of the velocity of the working fluid going into the accumulator unit, replace the cooler with a turbocharger or similar device.

Pressurizing the heater unit in the start-up mode or when ever the pressure is below the specified level is done by opening the accumulator control valve, see FIGS. 2 & 3. This governs the amount of working fluid that is withdrawn from the accumulator unit. The accumulator control valve is opened to the maximum, while the heater throttle valve modulating the amount of working fluid entering the power cylinder is at a minimum, causing the heater to retain most all of the working fluid that is discharged into it. Under steady state conditions the accumulator control valve keeps the pressure in the heater unit at the design level. A heater unit pressure relief valve, see FIG. 3, dumps working fluid into the heat exchanger unit whenever required.

The application of the engine can be for civil or military transportation, work vehicles, industrial power generation and many other commercial and military uses.

BRIEF DESCRIPTION OF THE DRAWINGS

FIG. 1 is a front sectional view of the engine showing the power cylinder, valves, valve springs, ports and the relationship of the major units.

DETAILED DESCRIPTION

The engine consists of four major units: a power unit 10, heat exchanger unit 32, accumulator unit 34, and heater unit 36. The fuel tank, starter, working fluid make-up tank and control mechanisms are considered peripheral components and are not discussed herein.

Figure 2:
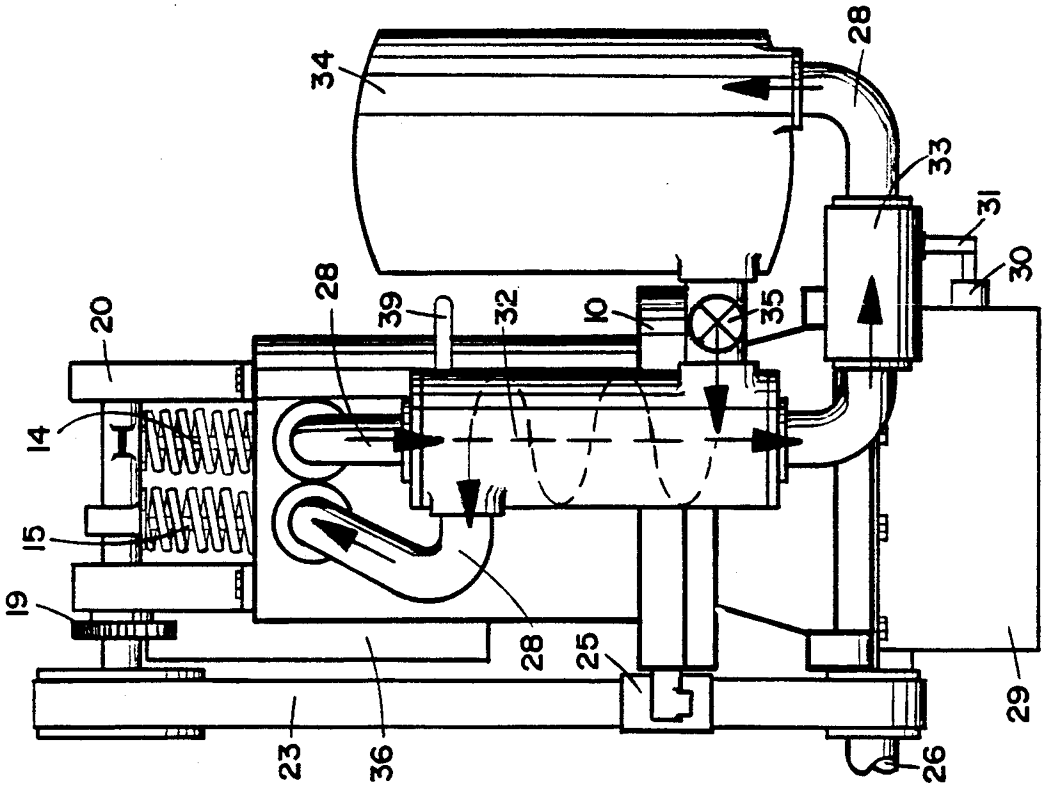
FIG. 2 is a side elevation view with valve and timing belt cover removed, showing the valve can mechanism and major units.

The power unit 10 is composed of a cylinder 11 with piston 12 that drives an output shaft 26 and sprocket 27, see FIGS. 1 & 2. The output shaft sprocket 27 moves the camshaft timing belt 23, that is in mesh with the camshaft timing sprocket 22, rotating the camshaft gears 19 and camshaft 18 that is mounted on the head of the power cylinder 11 by the camshaft support blocks 20. The timing belt tightener 25 that is attached to the power unit 10 insures the timing belt 23 will not slip and lose synchronization between the output shaft 26 and the power unit camshaft 18, see FIGS. 2 & 3. A valve cover 21 and timing belt cover 24 keep dirt and foreign matter from the mechanism.

Figure 3:
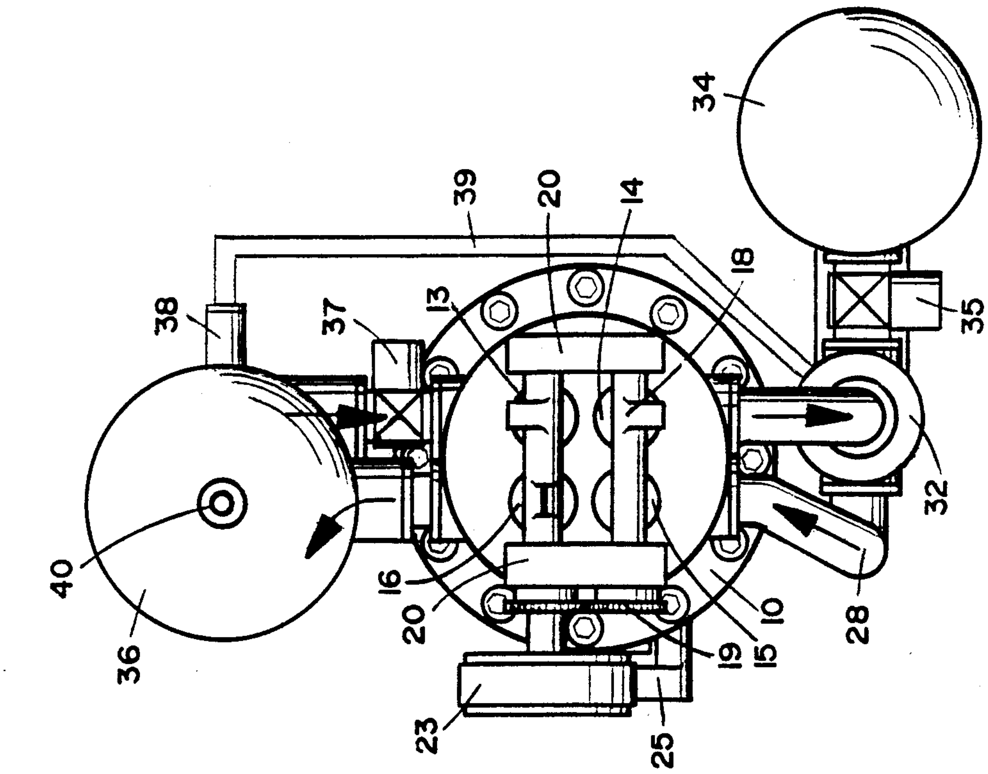
FIG. 3 is a plan view of the engine with timing belt and valve cover removed, showing the valve and cam mechanism and related major units.

The power unit camshaft 18 opens valves 13, 14, 15, and 16 and are then closed with valve springs 17 located on the head of the power unit 10, see FIGS. 1, 2, and 3.

Figure 4:
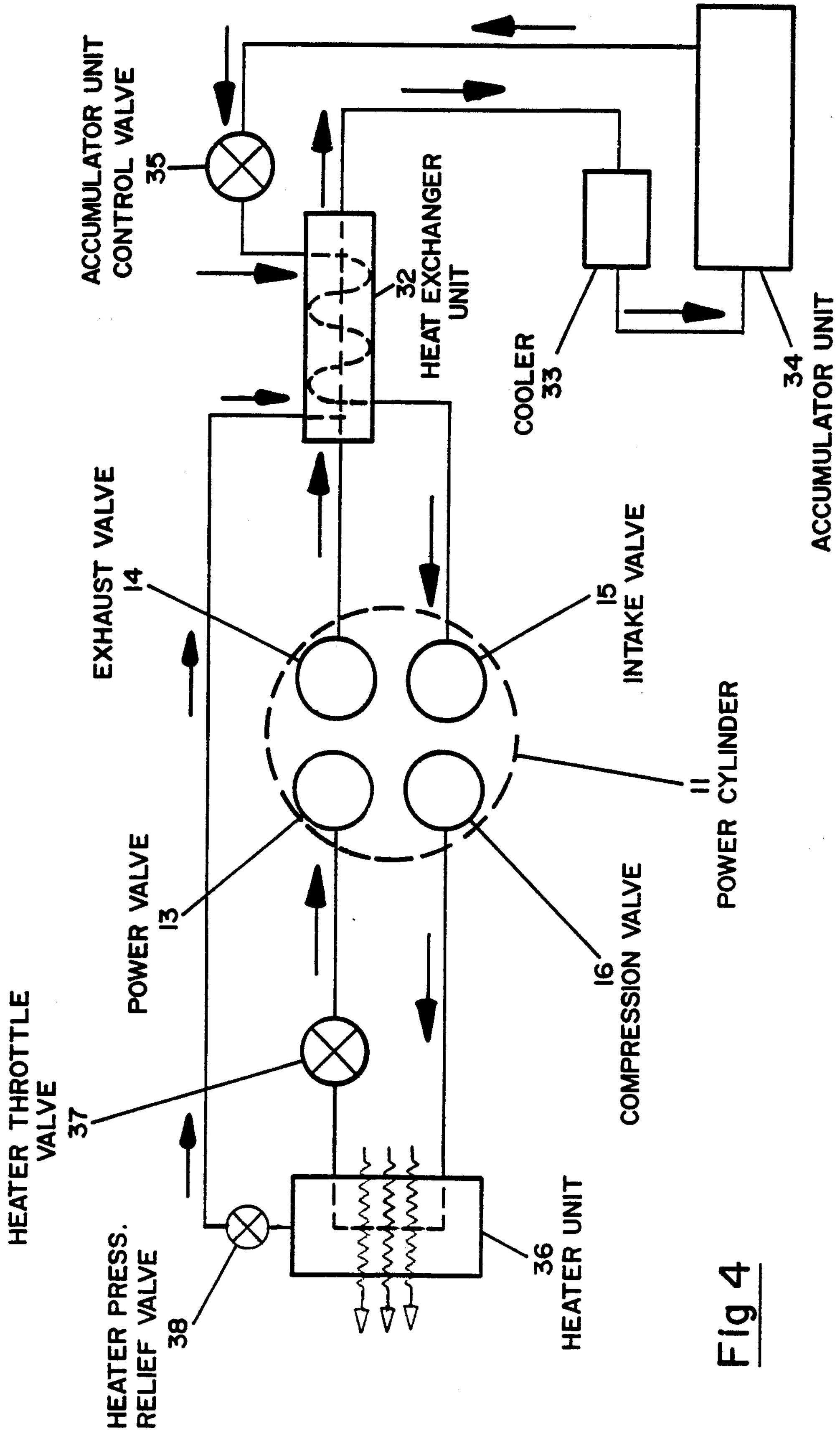
FIG. 4 is a working fluid flow diagram showing the working fluid's flow paths through the major units.

The heater throttle valve 37 is attached and communicates to both the heater unit 36 and the power unit 10, see FIGS. 3 & 4. When the power piston 12 is approximately at tdc the power valve 13 which communicates to the heater throttle valve 37 and power cylinder 11 opens, the heater throttle valve 37 and power required amount of working fluid from the heater unit 36 into the power cylinder 11 forcing the power piston 12 toward bdc doing work. At approximately bdc the exhaust valve 14 opens letting the working fluid exhaust through the heat exchanger unit 32 that is mounted to the power unit 10, by piping 28, through the cooler 33, mounted by piping 28 to the heat exchanger unit 32 and accumulator unit 34, then flows into the accumulator unit 34 where it is pooled.

On command the accumlator control valve 35, that is mounted between the accumulator unit 34 and heat exchanger unit 32 by piping 28, opens and working fluid is drawn through the heat exchanger unit 32 when the intake valve 15 opens and the power cylinder piston 12 moves toward bdc pulling in heated working fluid into the power cylinder 11, see FIGS. 1, 2, and 3. With all valves closed the power cylinder piston 12 advances toward tdc compressing the working fluid in the power cylinder 11. At approximately tdc the compression valve which communicates to both the power cylinder 11 and heater unit 36 opens forcing working fluid into the heater unit 36 completing the sequence of operation of the four cycle engine.

A heater pressure relief valve 38 located close to the heater unit 36 dumps working fluid into the heat exchanger unit 32 via the pressure relief piping 39 whenever the heater unit 36 exceeds the specified pressure. A heater unit fuel line 41 supplies the heater burner (not shown) with fuel located in the heater unit 36 and exhausts the burned combustibles through a heater unit exhaust port 40 located on the heater unit 36, see FIG. 3.

A power unit crankcase breather 30 attached to the power unit crankcase 29 filters the working fluid that by-passes the power cylinder piston 12 and dumps it into the cooler 33 by the crankcase breather tube 31.

FIG. 4 is a working fluid flow diagram showing the working fluid flow paths through the system. The working fluid flow is generated in the system by the power cylinder piston 12, see FIG. 1, in power cylinder 11 compressing the workingl fluid and opening compression valve 16 forcing the working fluid into the heater unit 36. Heat is applied to the working fluid as it flows through the heater unit 36, thence moves through the heater throttle valve 37 regulating the amount of working fluid flowing to the power valve 13. Power valve 13 opens and expands working fluid in power cylinder 11 to complete the power stroke, thence exhaust valve 14 exhausts working fluid through the heat exchanger unit 32 removing heat, thence flows through the cooler 33 further reducing the heat from the working fluid and dumping it into the accumulator unit 34 where it is stored. The working fluid is then modulated as it flows through the accumulator unit control valve 35, thence flows through the heat exchanger unit 32 absorbing residual heat, flows through intake valve 15 filling power cylinder 11 with working fluid to be compressed to complete the flow of an external combustion closed regenerative cycle.

Over pressurization of the working fluid in heater unit 36 is alleviated by dumping working fluid through the heater pressure relief valve 38 thence flowing to the exchanger unit 32 and therefore absorbed in the system.

Figure 5:
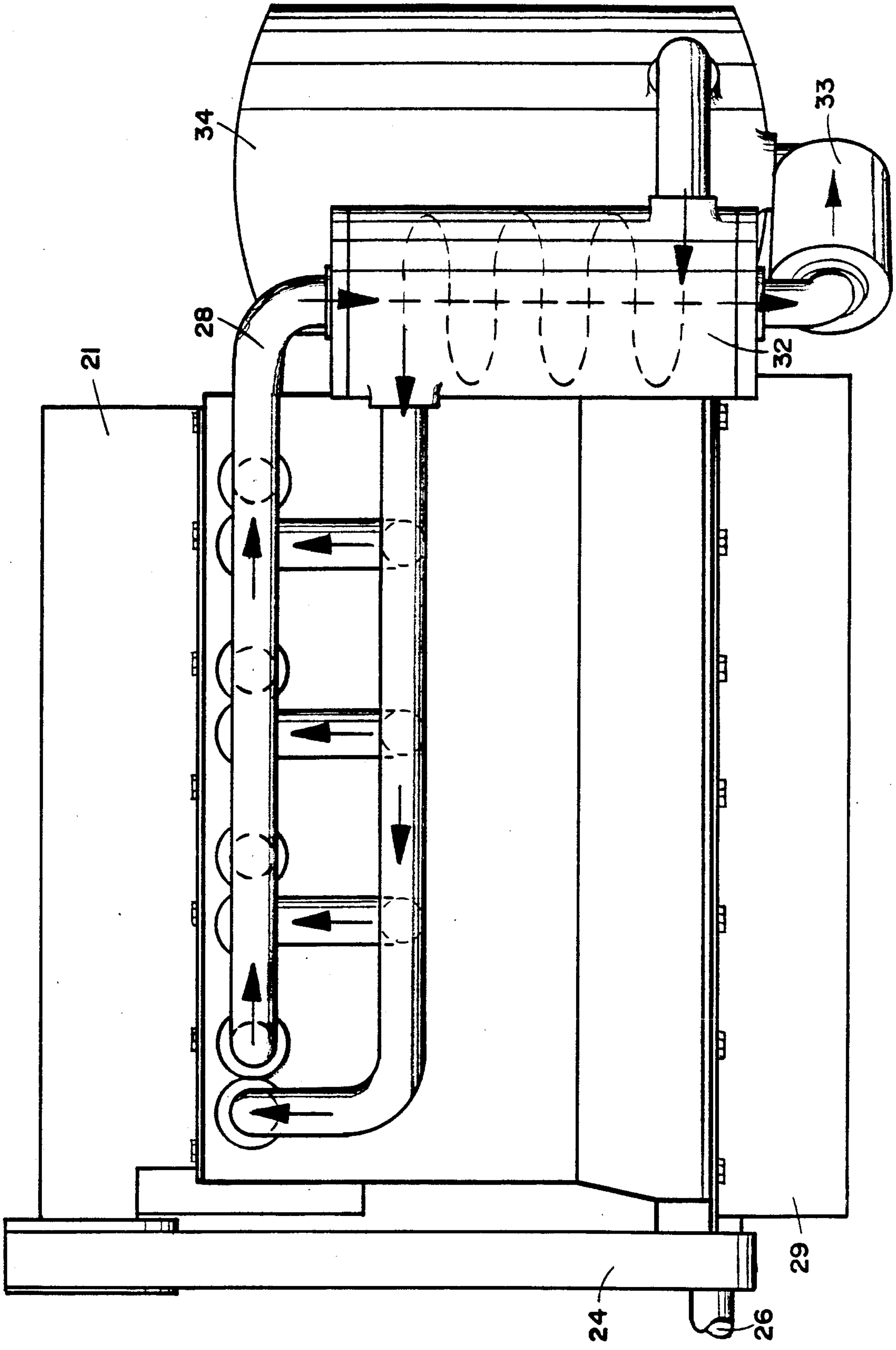
FIG. 5 is a longitudinal view of a four cylinder engine.

FIG. 5 is a view of a four cylinder inline engine showing the location of the output shaft 26 in respect to the timing belt cover 24, power unit crankcase 29 and valve cover 21.

Piping 28 shows the working fluid flow into the heat exchanger unit 32, through the cooler 33 and thence to the accumulator unit 34. The heat exchanger unit 32 receives working fluid from the accumulator unit 34 and therefore into piping 28, and thence to the engine.

What is claimed is:

1. A closed regenerative cycle engine in which a fluid is alternately expanded and compressed in a closed thermodynamic system comprising:

(a) a heater unit for heating a working fluid;

(b) a power cylinder in fluid flow communication with the heater for expanding the heated working fluid to produce work;

(c) a heater throttle valve located between the heater unit and the power cylinder for regulating the flow of working fluid from the heater to the power cylinder;

(d) a first intake valve associated with the power cylinder for controlling the admission of working fluid flowing from the heater unit under the influence of the heater throttle valve;

(e) a first exhaust valve associated with the power cylinder for controlling the exhaust flow from the cylinder after the heated working fluid has expanded in the cylinder;

(f) a regenerative heat exchanger in the exhaust flow from the cylinder for absorbing exhaust heat from the working fluid after it has expanded in the cylinder and been exhausted therefrom;

(g) a cooler in downstream fluid communication with the exhausted working fluid for cooling the working fluid after it has expanded in the cylinder and passed through the regenerative heat exchanger;

(h) an accumulator unit for receiving fluid from the cooler and storing said cooled fluid;

(i) a flow passage for allowing fluid to flow from the accumulator unit, through the regenerative heat exchanger, and thence to the power cylinder;

(j) an accumulator control valve regulating the flow of fluid between the accumulator unit and the regenerative heat exchanger;

(k) a second intake valve associated with the power cylinder for controlling the admission of fluid flowing from the accumulator under the influence of the accumulator control valve to the power cylinder;

(l) a second exhaust valve associated with the cylinder for controlling the exhaust of working fluid after it has been compressed in the cylinder;

(m) a flow passage allowing compressed working fluid to flow from the cylinder to the heater;

(n) whereby the working fluid is cyclically heated, expanded, regeneratively cooled, further cooled, stored, regeneratively heated, and compressed, in a cyclically manner; wherein the flow of fluid into and out of the power cylinder is controlled by a pair of inlet and exhaust valves during the power stroke, and a second pair of inlet and outlet valves when the cylinder is performing a compression stroke.

* * * * *